(12) United States Patent
Ludwiczek

(10) Patent No.: US 11,859,587 B2
(45) Date of Patent: Jan. 2, 2024

(54) METHOD FOR STARTING AN INTERNAL COMBUSTION ENGINE OF A MOTOR VEHICLE, AND MOTOR VEHICLE COMPRISING AN INTERNAL COMBUSTION ENGINE

(71) Applicant: Bayerische Motoren Werke Aktiengesellschaft, Munich (DE)

(72) Inventor: Kilian Ludwiczek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/597,293

(22) PCT Filed: Jun. 10, 2020

(86) PCT No.: PCT/EP2020/066035
§ 371 (c)(1),
(2) Date: Dec. 30, 2021

(87) PCT Pub. No.: WO2021/001126
PCT Pub. Date: Jan. 7, 2021

(65) Prior Publication Data
US 2022/0316434 A1    Oct. 6, 2022

(30) Foreign Application Priority Data

Jul. 3, 2019 (DE) ...................... 10 2019 118 009.0

(51) Int. Cl.
*F02N 11/08* (2006.01)
*F02D 13/02* (2006.01)
(Continued)

(52) U.S. Cl.
CPC ...... *F02N 11/0814* (2013.01); *F02D 13/0261* (2013.01); *F02D 41/042* (2013.01);
(Continued)

(58) Field of Classification Search
CPC .. F02N 11/0814; F02N 19/005; F02N 99/006; F02D 41/042
See application file for complete search history.

(56) References Cited

U.S. PATENT DOCUMENTS 10,145,340 B1* 12/2018 Dudar ................. F02D 41/0002
2003/0213454 A1* 11/2003 Grieser ................ F02N 99/006
123/179.18
(Continued)

FOREIGN PATENT DOCUMENTS

CN      102052187 A    5/2011
DE      100 39 948 A1  2/2002
(Continued)

OTHER PUBLICATIONS

Chinese-language Office Action issued in Chinese Application No. 202080035182.X dated Jun. 14, 2022 with English translation (15 pages).

(Continued)

*Primary Examiner* — Phutthiwat Wongwian
*Assistant Examiner* — Anthony L Bacon
(74) *Attorney, Agent, or Firm* — Crowell & Moring LLP

(57) ABSTRACT

A method for starting an internal combustion engine and a motor vehicle are provided. The internal combustion engine includes a plurality of cylinders. To start the internal combustion engine while deactivated, a predefined amount of working gas is introduced into the cylinder that fires first. A crankshaft of the internal combustion engine is driven by an electric motor and by the movement of a piston coupled to the crankshaft and associated with the cylinder that fires first to introduce the predefined amount of working gas. Subsequently, the internal combustion engine is started by the (Continued)

ignition of a mixture including the predefined amount of working gas and a predefined amount of fuel inside the cylinder that fires first.

19 Claims, 2 Drawing Sheets

(51) Int. Cl.
    *F02D 41/04*     (2006.01)
    *F02N 99/00*     (2010.01)
    *F02D 41/00*     (2006.01)

(52) U.S. Cl.
    CPC .... *F02N 99/006* (2013.01); *F02D 2013/0292* (2013.01); *F02D 2041/001* (2013.01); *F02N 2200/022* (2013.01)

(56) References Cited

U.S. PATENT DOCUMENTS

| | | | |
|---|---|---|---|
| 2005/0229889 A1* | 10/2005 | Hoevermann | F02N 11/06 123/179.4 |
| 2011/0290212 A1 | 12/2011 | Abboud et al. | |
| 2016/0319718 A1* | 11/2016 | Dudar | F02M 25/089 |
| 2018/0058407 A1* | 3/2018 | Hayashima | F02N 19/005 |
| 2019/0375286 A1* | 12/2019 | Lahr | B60K 6/40 |

FOREIGN PATENT DOCUMENTS

| | | |
|---|---|---|
| DE | 10 2005 062 500 A1 | 7/2007 |
| DE | 10 2007 009 857 A1 | 9/2008 |
| DE | 10 2009 046 533 A1 | 5/2011 |
| DE | 10 2011 102 015 A1 | 12/2011 |
| DE | 10 2012 011 993 A1 | 12/2013 |
| DE | 10 2015 225 887 A1 | 6/2017 |
| EP | 1 367 256 A1 | 12/2003 |
| EP | 2 738 058 A1 | 6/2014 |

OTHER PUBLICATIONS

International Search Report (PCT/ISA/210) issued in PCT Application No. PCT/EP2020/066035 dated Sep. 16, 2020 with English translation (five (5) pages).

German-language Written Opinion (PCT/ISA/237) issued in PCT Application No. PCT/EP2020/066035 dated Sep. 16, 2020 (five (5) pages).

German-language Search Report issued in German Application No. 10 2019 118 009.0 dated Mar. 4, 2020 with partial English translation (13 pages).

* cited by examiner

METHOD FOR STARTING AN INTERNAL COMBUSTION ENGINE OF A MOTOR VEHICLE, AND MOTOR VEHICLE COMPRISING AN INTERNAL COMBUSTION ENGINE

BACKGROUND AND SUMMARY OF THE INVENTION

The present subject matter relates to a method for starting an internal combustion engine of a motor vehicle. A further aspect of the present subject matter relates to a motor vehicle having an internal combustion engine.

Modern motor vehicles driven by an internal combustion engine use so-called stop-start systems in order to avoid relatively long idle phases of the internal combustion engine and thereby to bring about a reduction in fuel consumption. In order to restart the internal combustion engine after a stop has occurred, for example at a traffic light, a so-called direct start of the internal combustion engine can occur. Here, fuel can be injected into a cylinder of the internal combustion engine that is in a compression cycle and ignited in order thereby to accelerate a crankshaft of the internal combustion engine from standstill or to successively fire it directly after the first exceeded top dead center of the cylinder in compression.

In order to allow a reliable direct start after a stop has occurred, it is frequently attempted during an engine rundown of the internal combustion engine to guide a sufficient quantity of fresh air into the cylinder which is fired first during starting of the internal combustion engine.

Thus, for example, DE 10 2015 225 887 A1 discloses a method for fresh-air conditioning during the engine rundown of an internal combustion engine having a plurality of cylinders, wherein fresh air is supplied via a suction pipe to all of the cylinders in a fresh-air mode. At the beginning of the engine rundown, a combustion mode of at least one, but not all of the cylinders is maintained until a predetermined duration has expired, whereas the remaining cylinders are operated in fresh-air mode. After the predetermined duration has expired, all of the cylinders are operated in fresh-air mode.

It is an object of the present subject matter to provide a method and a motor vehicle of the type stated at the outset by means of which it is possible to achieve improved reproducibility of starting operations of the internal combustion engine.

An aspect of the present subject matter relates to a method for starting an internal combustion engine of a motor vehicle that comprises a plurality of cylinders, in which method, to start the internal combustion engine, a predetermined quantity of working gas is introduced, with the internal combustion engine deactivated, into the cylinder which is fired first when starting the internal combustion engine, in that a crankshaft of the internal combustion engine is driven by an electric motor, and a piston, which is coupled to the crankshaft and is assigned to the cylinder which is fired first, is moved in order to introduce the predetermined quantity of working gas and then the starting of the internal combustion engine occurs in that an ignition of a mixture, which comprises the predetermined quantity of working gas and a predetermined quantity of fuel, is effected within the cylinder which is fired first. The cylinder which is fired first when starting the internal combustion engine can also be referred to as a starting cylinder. Air can be introduced into the starting cylinder as the working gas. When the internal combustion engine is deactivated, the latter is in an operating state in which driving of the crankshaft of the internal combustion engine by (intermittent) combustion of fuel in the respective cylinders ceases.

The method is advantageous insofar as the piston can be moved in a targeted manner by the crankshaft being driven using the electric motor in order to introduce the predetermined quantity of working gas into the cylinder, for example via an inlet duct of the internal combustion engine, this being able to occur by sucking the predetermined quantity of working gas into this cylinder. By virtue of the crankshaft being driven using the electric motor, the piston can moreover, during each stop of the internal combustion engine, be moved reproducibly into a predetermined crank angle position such that, during each start, in particular direct start, of the internal combustion engine, reproducible and at least virtually identical combustion conditions for the mixture can be created in the cylinder which is fired first. By virtue of the electric motor, the predetermined crank angle position can be set reproducibly in particular in the compression cycle of the cylinder (starting cylinder) which is fired first when starting the internal combustion engine. This can effectively avoid a situation in which, for different starting operations, in each case different fillings in terms of quantity on the one hand and in terms of pressure and residual gas content on the other hand are present in the cylinder which is fired first when starting the internal combustion engine. Accordingly, the method can avoid a situation in which considerable acoustic differences, strong oscillation differences (rotational speed oscillations) and strong differences in respective acceleration profiles of the crankshaft occur during the different starting operations. The method instead allows a defined filling, with the predetermined quantity of working gas, of the cylinder which is fired first when starting the internal combustion engine. This makes it possible overall to carry out the starting operations, which can also be referred to as starts, in a reproducible, oscillation-optimized and acoustic-optimized manner.

The starting of the internal combustion engine can occur, in particular in a starterless manner, using the method. In other words, the starting of the internal combustion engine can occur without the assistance of a starter and also without the assistance of the electric motor or at least with particularly low starter powers. Instead, the starting of the internal combustion engine can occur in the method exclusively using mixture combustion, that is to say by combusting the mixture composed of the predetermined quantity of working gas and of the predetermined quantity of fuel.

In an advantageous development of the present subject matter, the predetermined quantity of working gas is introduced during an engine rundown of the internal combustion engine. This is advantageous since the engine rundown of the internal combustion engine can thus be used in order to fill, with the predetermined quantity of working gas, the cylinder (starter cylinder) which is fired first when starting the internal combustion engine. The crankshaft can already rotate during the engine rundown with the internal combustion engine deactivated, wherein the crankshaft, by being driven using the electric motor, can be maintained in a rotating state at least over a predetermined time interval in order to effect the defined filling of the starting cylinder with the predetermined quantity of working gas.

In a further advantageous development of the present subject matter, the crankshaft is driven using the electric motor at a rotational speed which is less than an idle rotational speed of the internal combustion engine. This is advantageous since particularly low-noise driving of the crankshaft using the electric motor can occur as a result.

Moreover, the driving of the crankshaft at this rotational speed can occur with particularly low friction losses.

In a further advantageous development of the present subject matter, valve strokes of the respective gas exchange valves, which are assigned to the cylinder which is fired first when starting the internal combustion engine, are set using a valve control device in order to introduce the working gas into the cylinder which is fired first. This is advantageous since the valve control device allows a particularly large degree of flexibility in the setting of the valve strokes of the respective gas exchange valves. In an advantageous manner, the valve control device can be used for variable valve control of the gas exchange valves.

In a further advantageous development of the present subject matter, the valve stroke of at least one inlet valve of the respective gas exchange valves is set in order to introduce the working gas into the cylinder which is fired first. This is advantageous since the setting of the valve stroke of the at least one inlet valve allows particularly quick filling of the cylinder which is fired first when starting the internal combustion engine. The valve control device can set a maximum value of the valve stroke of the at least one inlet valve in order to introduce the predetermined quantity of working gas in the shortest possible time and with particularly low flow resistance.

In a further advantageous development of the present subject matter, the valve stroke of at least one outlet valve of the respective gas exchange valves is set in order to introduce the working gas into the cylinder which is fired first. This is advantageous since the setting of the valve stroke of the at least one outlet valve allows particularly effective discharge of residual gas, which can also be referred to as inert gas, contained in the cylinder. This promotes the scavenging of the cylinder and also the ignition of the mixture composed of the predetermined quantity of working gas and of the predetermined quantity of fuel to start the internal combustion engine.

In a further advantageous development of the present subject matter, the crankshaft is coupled to at least one drive wheel of the motor vehicle in a torque-transmitting manner while the crankshaft is driven by the electric motor. This is advantageous since both the at least one drive wheel can be driven and the predetermined quantity of working gas can be introduced into the starting cylinder as a result. This allows a particularly energy-saving operation of the motor vehicle.

In a further advantageous development of the present subject matter, the crankshaft is accelerated from its standstill using the electric motor and, after the predetermined quantity of working gas has been introduced into the cylinder which is fired first, is set into standstill. This is advantageous since it is possible hereby for the introduction of the predetermined quantity of working gas to occur independently of whether the deactivated internal combustion engine is, for example, in the state of engine rundown. The electric motor can thus accelerate the crankshaft to introduce the predetermined quantity of working gas into the cylinder which is fired first when starting the internal combustion engine without the internal combustion engine being started.

In a further advantageous development of the present subject matter, the crankshaft is rotated from its standstill using the electric motor in a direction which is oriented opposite to an operating direction of rotation of the crankshaft with the internal combustion engine activated. This is advantageous since it is possible hereby to achieve improved scavenging of the cylinder which is fired first when starting the internal combustion engine, with the result that residual gas can be removed particularly effectively from the first cylinder.

An aspect of the present subject matter relates to a motor vehicle having an internal combustion engine which comprises a plurality of cylinders, and having a control device which is designed to control an electric motor in such a way that the electric motor drives a crankshaft of the deactivated internal combustion engine and thereby moves a piston, which is coupled to the crankshaft and is assigned to the cylinder which is fired first, in order thereby, to start the deactivating internal combustion engine, to introduce a predetermined quantity of working gas into the cylinder which is fired first when starting the internal combustion engine, wherein the control device is designed to control a starter of the internal combustion engine in such a way that the starting of the internal combustion engine occurs in that, using the starter, an ignition of a mixture, which comprises the predetermined quantity of working gas and a predetermined quantity of fuel, is effected within the cylinder which is fired first.

The features, and advantages thereof, which are presented in connection with the method according to the present subject matter according to the present subject matter correspondingly apply to the present subject matter according to the second aspect of the present subject matter, and vice versa. The motor vehicle can be configured, for example, as a passenger car or as truck. Alternatively, the motor vehicle can also be configured as a motor cycle.

Further features of the present subject matter will emerge from the claims, the figures and the description of the figures. The features and combinations of features which are mentioned above in the description and also the features and combinations of features which are mentioned below in the description of the figures and/or which are shown in the figures alone can be used not only in the respectively specified combination, but also in other combinations or in isolation.

BRIEF DESCRIPTION OF THE DRAWINGS

FIG. 1 is a schematic illustration showing a motor vehicle 1 having an internal combustion engine 2.

DETAILED DESCRIPTION OF THE DRAWINGS

Figure 1:
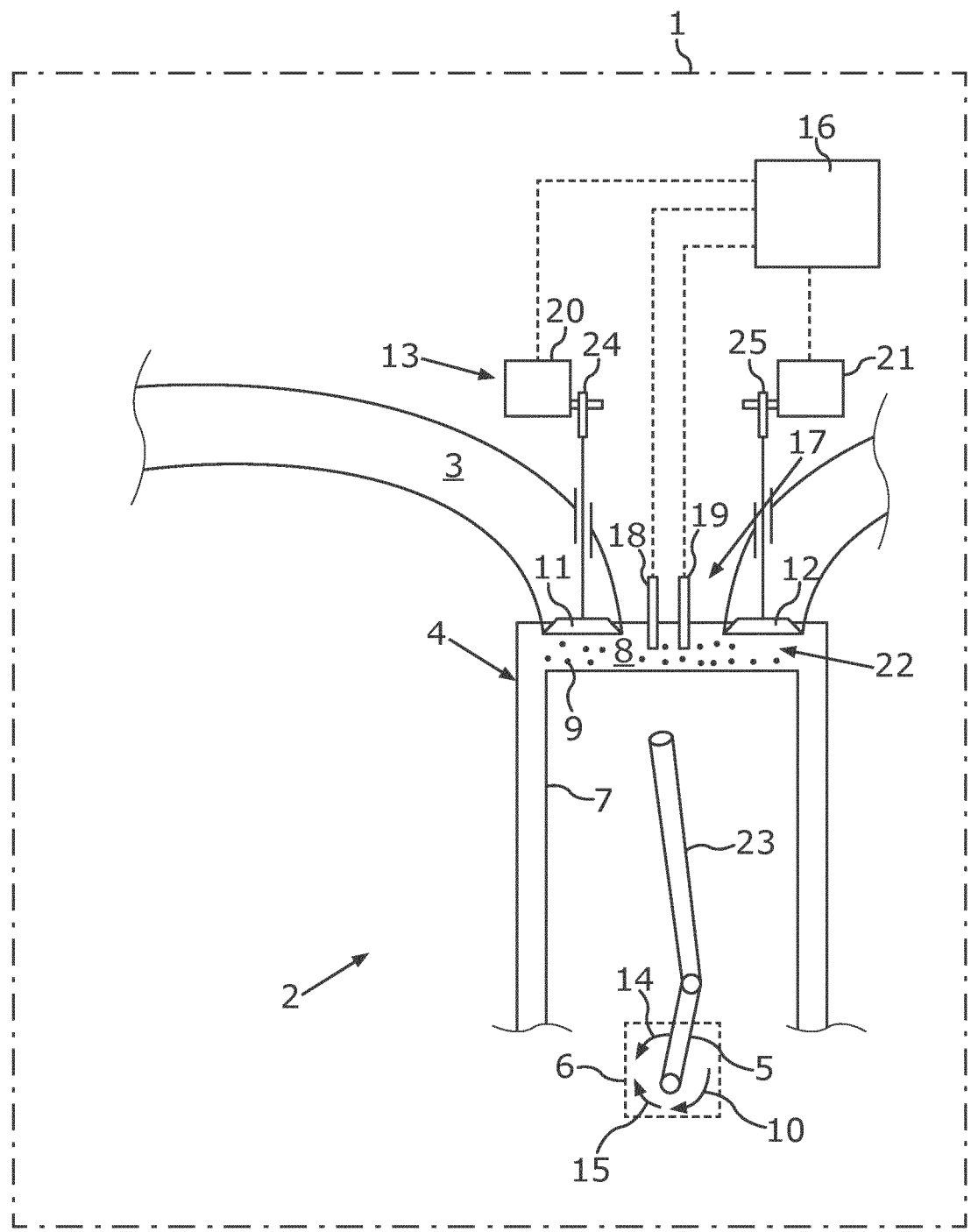
FIG. 1 shows a schematic illustration of a motor vehicle having an internal combustion engine and having an electric motor using which a crankshaft of the internal combustion engine can be driven in order to introduce a predetermined quantity of working gas into a cylinder of the internal combustion engine that is fired first when starting the internal combustion engine.

The internal combustion engine 2 comprises a plurality of cylinders, of which in the present case only one cylinder 4 is shown. In the variant shown in FIG. 1, the cylinder 4 corresponds to a so-called starting cylinder which is fired first when starting the internal combustion engine 2. Accordingly, the cylinder 4 can also be referred to as a starting cylinder. In a cylinder interior of the cylinder 4 there is arranged a piston 7 which is assigned to the cylinder 4 and which, together with the cylinder 4, delimits a combustion chamber 22. The piston 7 is coupled to a crankshaft 5 of the internal combustion engine 2 via a connecting rod 23. The crankshaft 5 can be coupled via a clutch (not shown further here) of the motor vehicle 1 to a transmission (likewise not shown further) of the motor vehicle 1. The transmission is coupled to drive wheels (not shown further here) of the motor vehicle 1.

Working gas 3 can be introduced into the combustion chamber 22 and residual gas in the form of exhaust gas can be discharged from the combustion chamber 22 via respective gas exchange valves 11, 12 which can be assigned to the cylinder 4. Working gas 3 in the form of air can flow into the combustion chamber 22 via the gas exchange valve 11 formed as an inlet valve, insofar as the gas exchange valve 11 is in an open position. Via the gas exchange valve 12 which is formed as an outlet valve, the residual gas can flow out of the combustion chamber 22 and be supplied to exhaust-gas after-treatment systems (not shown further here) of the internal combustion engine 2, which can include, for example, a catalytic converter and a particulate filter.

The gas exchange valves 11, 12 can be actuated via respective camshafts which are coupled to the crankshaft 5. Thus, one of these camshafts can be formed as an inlet camshaft 24 for actuating the gas exchange valve 11 configured as an inlet valve. Another of these camshafts can be formed as an outlet camshaft 25 for actuating the gas exchange valve 12 configured as an outlet valve.

The gas exchange valves 11, 12 can also be actuated via a valve control device 13. The valve control device 13 serves to set the valve strokes of the respective gas exchange valves 11, 12, which are assigned to the cylinder 4 which is fired first when starting the internal combustion engine, in order to introduce the working gas 3 into the cylinder 4 which is fired first.

For this purpose, the valve control device 13 comprises an inlet valve controller 20 and an outlet valve controller 21. Using the inlet valve controller 20, the valve stroke of the inlet valve (gas exchange valve 11) can be set additionally or alternatively to the inlet camshaft 24 in order to introduce the working gas 3 into the cylinder 4. Using the outlet valve controller 21, the valve stroke of the gas exchange valve 12 (outlet valve) can be set additionally or alternatively to the outlet camshaft 25, in order to introduce the working gas 3 into the cylinder 4. Opening both the inlet valve (gas exchange valve 11) and the outlet valve (gas exchange valve 12) allows scavenging of the combustion chamber 22 to be effected, with the result that the predetermined quantity of working gas 3 can be introduced into the cylinder 4, and thus into the combustion chamber 22, with reduction of a flow resistance.

The motor vehicle 1 is in the present case configured as a hybrid vehicle and comprises an electric motor 6 which is coupled to the crankshaft 5. The electric motor 6 can, for example, take the form of a motor generator, with the result that both a motor mode and a generator mode of the electric motor 6 are possible. Just like the drive wheels, the crankshaft 5 can be driven using the electric motor 6.

To control the electric motor 6, the motor vehicle 1 comprises an electronic control device 16 which is designed to control the electric motor 6 in such a way that the electric motor 6 drives the crankshaft 5 of the deactivated internal combustion engine 2 and thereby moves the piston 7, which is coupled to the crankshaft 5 and assigned to the cylinder 4 which is fired first. As a result, for subsequent starting of the deactivated internal combustion engine 2, a predetermined quantity of the working gas 3 is introduced into the cylinder 4 which is fired first when starting the internal combustion engine 2. The predetermined quantity of the working gas 3 is in the present case introduced into the combustion chamber 22 during an engine rundown of the internal combustion engine 2.

The electronic control device 16 is designed to control a starter 17 of the internal combustion engine 2 in such a way that the starting of the internal combustion engine 2 occurs in that, using the starter 17, an ignition of a mixture 8, which is formed in the combustion chamber 22 and comprises the predetermined quantity of working gas 3 and a predetermined quantity of fuel 9, is effected within the cylinder 4 which is fired first.

The starter 17 comprises in the present case an injector 18 and an igniter 19. Using the injector 18, the predetermined quantity of fuel 9 can, for example, be directly introduced into the combustion chamber 22. For this purpose, the injector 18 can comprise an injector. Using the igniter 19, the mixture 8 can be ignited and, as a result, the internal combustion engine 2 can be activated in that, on account of the ignition of the mixture 8, the crankshaft 5 is rotated in an operating direction of rotation 15 illustrated by an arrow. Subsequent intermittent firing of the cylinders of the internal combustion engine 2 causes the crankshaft 5 to be accelerated further until, for example, the idle rotational speed of the internal combustion engine 2 has been reached.

The crankshaft 5 can be driven using the electric motor at a rotational speed 10 which is less than an idle rotational speed of the internal combustion engine 2. Alternatively, the crankshaft 5 can also be accelerated from its standstill using the electric motor 6 and, after the predetermined quantity of working gas 3 has been introduced into the cylinder 4 which is fired first, can be set into standstill again. Furthermore, the crankshaft 5 can be rotated from its standstill using the electric motor in a direction 14 which is oriented opposite to the operating direction of rotation 15 of the crankshaft 5 with the internal combustion engine 2 activated.

Moreover, the crankshaft 5 can be coupled to the drive wheels of the motor vehicle 1 in a torque-transmitting manner while the crankshaft 5 is driven by the electric motor 6. The piston 7 can be moved in a defined manner by the crankshaft 5 being driven using the electric motor 6, and in addition the scavenging of the combustion chamber 22 with the working gas 3 can be effected by opening the gas exchange valves 11, 12. This can ensure that, during subsequent starting of the internal combustion engine 2, little residual gas is contained in the combustion chamber 22 and a defined quantity of fresh air is available for starting the internal combustion engine 2 by igniting the mixture 8.

Figure 2:
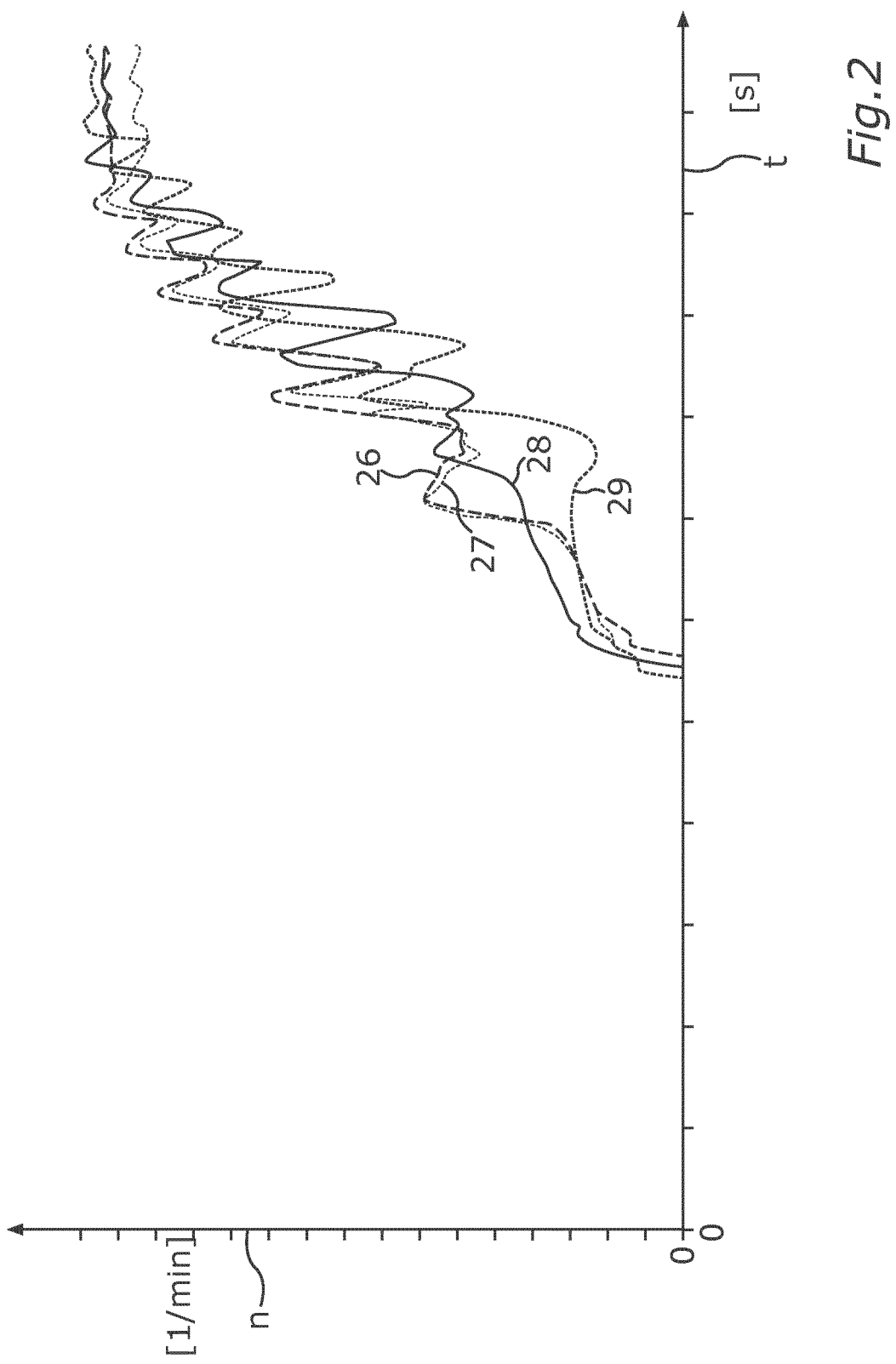
FIG. 2 shows a diagram which shows qualitatively different rotational speed profiles of the crankshaft during different starting operations of the internal combustion engine.

FIG. 2 shows a diagram on whose ordinate axis a rotational speed n is plotted and whose abscissa axis a time t is plotted. The diagram shows qualitatively different rotational speed profiles 26, 27, 28, 29 of the crankshaft 5 which can result when starting the internal combustion engine 2. It can be seen in FIG. 2 that the rotational speed profiles 26, 27 are situated tightly together and have a very similar profile, this indicating good reproducibility of respective starting operations of the internal combustion engine 2 on which the rotational speed profiles 26, 27 are based. In order to achieve the rotational speed profiles 26, 27, the predetermined quantity of working gas 3 has been introduced, with the internal combustion engine 2 deactivated, into the cylinder 4 which is fired first when starting the internal combustion engine 2. By contrast thereto, the further rotational speed profiles 28, 29 show that poor reproducibility is achieved when the introduction of the predetermined quantity of the working gas 3 into the cylinder 4 ceases. The rotational speed profiles 26, 27 thus result with an optimized filling of the starting cylinder (cylinder 4) with the predetermined quantity of working gas 3, whereas the unfavorable rotational speed profiles 28, 29 result with non-optimized filling of the cylinder 4.

LIST OF REFERENCE SIGNS

1 Motor vehicle
2 Internal combustion engine
3 Working gas
4 Cylinder
5 Crankshaft
6 Electric motor
7 Piston
8 Mixture
9 Quantity of fuel
10 Rotational speed
11 Gas exchange valve
12 Gas exchange valve
13 Valve control device
14 Direction
15 Operating direction of rotation
16 Electronic control device
17 Starter
18 Injector
19 Igniter
20 Inlet valve controller
21 Outlet valve controller
22 Combustion chamber
23 Connecting rod
24 Inlet camshaft
25 Outlet camshaft
26 Rotational speed profile
27 Rotational speed profile
28 Rotational speed profile
29 Rotational speed profile
n Rotational speed
t Time

What is claimed is:

1. A method for starting an internal combustion engine of a motor vehicle comprising a plurality of cylinders, comprising:
    driving, while the internal combustion engine is deactivated, a crankshaft of the internal combustion engine using an electric motor to move both:
        a piston, which is coupled to the crankshaft and assigned to a cylinder that is fired first of the plurality of cylinders, to introduce a predetermined quantity of working gas into the cylinder that is fired first, and
        a drive wheel of the motor vehicle coupled to the crankshaft in a torque-transmitting manner; and
    starting the internal combustion engine via ignition of a mixture comprising the introduced predetermined quantity of working gas and a predetermined quantity of fuel within the cylinder that is fired first.

2. The method according to claim 1, wherein
the predetermined quantity of working gas is introduced during an engine rundown of the internal combustion engine.

3. The method according to claim 1, wherein
the crankshaft is driven by the electric motor at a rotational speed less than an idle rotational speed of the internal combustion engine.

4. The method according to claim 1, wherein
valve strokes of respective gas exchange valves, which are assigned to the cylinder that is fired first when starting the internal combustion engine, are set using a valve control device to introduce the working gas into the cylinder that is fired first.

5. The method according to claim 4, wherein
the valve stroke of an inlet valve of the respective gas exchange valves is set in order to introduce the working gas into the cylinder that is fired first.

6. The method according to claim 4, wherein
the valve stroke of an outlet valve of the respective gas exchange valves is set to introduce the working gas into the cylinder that is fired first.

7. The method according to claim 1, further comprising:
    accelerating the crankshaft from a standstill by the electric motor; and
    after the predetermined quantity of working gas has been introduced into the cylinder that is fired first, setting the crankshaft into the standstill again.

8. The method according to claim 7, wherein
the crankshaft is rotated from the standstill by the electric motor in a direction that is oriented opposite to an operating direction of rotation of the crankshaft with the internal combustion engine activated.

9. A motor vehicle comprising:
    an internal combustion engine comprising a plurality of cylinders; and
    an electronic control device configured to:
        control an electric motor to drive a crankshaft of the internal combustion engine when deactivated to move a piston, which is coupled to the crankshaft and is assigned to a cylinder that is fired first of the plurality of cylinders, to after a top dead center of the cylinder in compression that is fired first, and to move a drive wheel of the motor vehicle coupled to the crankshaft in a torque-transmitting manner,
        introduce a predetermined quantity of working gas into the cylinder that is fired first when starting the internal combustion engine, and
        control a starter of the internal combustion engine such that the starting of the internal combustion engine occurs via an ignition of a mixture within the cylinder that is fired first, wherein
            the mixture comprises the introduced predetermined quantity of working gas and a predetermined quantity of fuel.

10. A method for starting an internal combustion engine of a motor vehicle comprising a plurality of cylinders, comprising:
    driving, while the internal combustion engine is deactivated, a crankshaft of the internal combustion engine using an electric motor to move both:
        a piston, which is coupled to the crankshaft and assigned to a cylinder that is fired first of the plurality of cylinders, to introduce a predetermined quantity of working gas into the cylinder that is fired first; and
        a drive wheel of the motor vehicle coupled to the crankshaft in a torque-transmitting manner;
    setting valve stroke of a gas exchange valve of the cylinder that is fired first using a valve control device to introduce the predetermined quantity of working gas into the cylinder that is fired first; and
    starting the internal combustion engine via ignition of a mixture comprising the introduced predetermined quantity of working gas and a predetermined quantity of fuel within the cylinder that is fired first.

11. The method of claim 10, wherein
the valve control device sets the gas exchange valve of the cylinder that is fired first of the plurality of cylinders.

12. The method of claim 10, wherein
the gas exchange valve further comprises an inlet valve and an outlet valve, and
the valve control device further comprises a respective inlet valve control device and an outlet valve control device that each set the valve strokes of the inlet valve and the outlet valve, respectively.

13. The method of claim 10, wherein the internal combustion engine further comprises a camshaft to actuate at least one of the gas exchange valves, and the method further comprises:
setting the valve stroke of the gas exchange valve using the camshaft in addition to the valve control device.

14. The method of claim 10, wherein
the gas exchange valve further comprises an inlet valve and an outlet valve, and
the valve control device sets both the inlet valve and the outlet valve to an open position.

15. The motor vehicle of claim 9, wherein the electronic control device is further configured to:
set a valve stroke of a gas exchange valve of the cylinder that is fired first using a valve control device to introduce the predetermined quantity of working gas into the cylinder that is fired first.

16. The motor vehicle of claim 9, further comprising:
a valve control device is configured to set a gas exchange valve of the cylinder that is fired first of the plurality of cylinders.

17. The motor vehicle of claim 9, wherein the cylinder to be fired first further comprises:
an inlet valve, and
an outlet valve; and the motor vehicle further comprises:
an inlet valve control device configured to set a valve stroke of the inlet valve, and
an outlet valve control device configured to set a valve stroke of the outlet valve.

18. The motor vehicle of claim 9, wherein the internal combustion engine further comprises:
a camshaft to actuate a gas exchange valve of the cylinder to be fired first by setting a valve stroke, and
a valve control device configured to further set the valve stroke of the gas exchange valve in addition to the camshaft.

19. The motor vehicle of claim 9, wherein the cylinder to be fired first further comprises:
an inlet valve, and
an outlet valve, and the motor vehicle further comprises:
a valve control device configured to set both the inlet valve and the outlet valve to an open position.

* * * * *